United States Patent
Kim et al.

(10) Patent No.: US 8,509,710 B2
(45) Date of Patent: Aug. 13, 2013

(54) MIMO TRANSMISSION WITH EXPLICIT AND IMPLICIT CYCLIC DELAYS

(75) Inventors: Byoung-Hoon Kim, Seoul (KR); Durga Prasad Malladi, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 978 days.

(21) Appl. No.: 12/235,466

(22) Filed: Sep. 22, 2008

(65) Prior Publication Data

US 2009/0197546 A1 Aug. 6, 2009

Related U.S. Application Data

(63) Continuation-in-part of application No. 12/026,370, filed on Feb. 5, 2008, now abandoned.

(60) Provisional application No. 60/888,494, filed on Feb. 6, 2007.

(51) Int. Cl.
*H04B 1/18* (2006.01)

(52) U.S. Cl.
USPC .............. 455/101; 455/69; 455/103; 375/299

(58) Field of Classification Search
USPC .............. 455/101, 452.2, 67.16, 67.11, 67.13, 455/68, 69, 103, 115.1, 126, 114.2, 501; 375/260, 267, 295, 299, 346, 347; 370/204, 370/252, 260, 208–209
See application file for complete search history.

(56) References Cited

U.S. PATENT DOCUMENTS

| | | | |
|---|---|---|---|
| 6,377,632 B1 | 4/2002 | Paulraj et al. | |
| 6,842,487 B1 | 1/2005 | Larsson | |
| 7,385,617 B2 * | 6/2008 | Tahat | 347/147 |

(Continued)

FOREIGN PATENT DOCUMENTS

| | | |
|---|---|---|
| EP | 1919115 | 5/2008 |
| JP | 2008118650 A | 5/2008 |

(Continued)

OTHER PUBLICATIONS

International Search Report and Written Opinion—PCT/US2008/053232, International Search Authority—European Patent Office—Sep. 3, 2008.

(Continued)

*Primary Examiner* — Pablo Tran
(74) *Attorney, Agent, or Firm* — Peng Zhu (57) ABSTRACT

Techniques for transmitting data using a combination of explicit cyclic delay and implicit cyclic delay are described. A transmitter may perform first processing for cyclic delay diversity (or explicit cyclic delay processing) based on a first set of cyclic delay values known to a receiver. The transmitter may perform precoding based on a precoding matrix either before or after the explicit cyclic delay processing. The transmitter may perform second processing for cyclic delay diversity (or implicit cyclic delay processing) based on a second set of cyclic delay values unknown to the receiver. The transmitter may perform both explicit and implicit cyclic delay processing for data and may perform only implicit cyclic delay processing for pilot. One entity may select the first set of cyclic delay values and inform the other entity. The transmitter may autonomously select the second set of cyclic delay values without informing the receiver.

27 Claims, 8 Drawing Sheets

(56) References Cited

U.S. PATENT DOCUMENTS

| | | | |
|---|---|---|---|
| 7,609,613 | B2 | 10/2009 | Aghvami et al. |
| 7,839,944 | B2 | 11/2010 | Lee et al. |
| 7,848,438 | B2 * | 12/2010 | Baum et al. .................... 375/260 |
| 7,894,548 | B2 | 2/2011 | Walton et al. |
| 8,068,552 | B2 * | 11/2011 | Wang et al. .................... 375/267 |
| 2005/0201270 | A1 * | 9/2005 | Song et al. .................... 370/208 |
| 2006/0068698 | A1 | 3/2006 | Sandhu et al. |
| 2006/0077886 | A1 | 4/2006 | Oh et al. |
| 2006/0078063 | A1 | 4/2006 | Hottinen |
| 2007/0098097 | A1 | 5/2007 | Khan et al. |
| 2007/0140377 | A1 | 6/2007 | Murakami et al. |
| 2007/0274411 | A1 | 11/2007 | Lee et al. |
| 2008/0039030 | A1 | 2/2008 | Khan et al. |
| 2008/0132282 | A1 | 6/2008 | Liu et al. |
| 2008/0183311 | A1 | 7/2008 | MacArthur et al. |
| 2008/0247364 | A1 | 10/2008 | Kim et al. |
| 2009/0067531 | A1 | 3/2009 | Lee et al. |
| 2009/0219858 | A1 * | 9/2009 | Liang et al. .................... 370/328 |
| 2009/0225646 | A1 * | 9/2009 | Dayal et al. .................... 370/204 |
| 2009/0307558 | A1 | 12/2009 | Lee et al. |
| 2010/0075693 | A1 * | 3/2010 | Kishigami et al. ......... 455/452.2 |
| 2010/0322349 | A1 * | 12/2010 | Lee et al. ....................... 375/299 |
| 2011/0116566 | A1 * | 5/2011 | Takahashi et al. ............ 375/267 |
| 2011/0129027 | A1 * | 6/2011 | Takaoka et al. ............... 375/260 |

FOREIGN PATENT DOCUMENTS

| | | |
|---|---|---|
| JP | 2009538556 A | 11/2009 |
| JP | 2010502110 A | 1/2010 |
| RU | 2208297 C2 | 7/2003 |
| WO | WO0101626 A1 | 1/2001 |
| WO | 0225857 | 3/2002 |
| WO | 2005117321 | 12/2005 |
| WO | 2006021227 | 3/2006 |
| WO | WO2006021228 A1 | 3/2006 |
| WO | 2006121381 | 11/2006 |

OTHER PUBLICATIONS

Qualcomm Europe: R1-070434: Precoding Details for DL MIMO, 3GPP TSG-RAN WG1 #47bis, Sorrento Italy, Jan. 15-19, 2007.

International Search Report and Written Opinion—PCT/US2008/053233, International Search Authority—European Patent Office—Sep. 15, 2008.

LG Electronics, et al., "CDD-based Precoding for E-UTRA downlink MIMO", 3GPP TSG RAN WG1 Meeting#47, Nov. 2006, pp. 1-6, R1-063345.

LG Electronics, et al., "Generalized CDD scheme for E-UTRA down link MIMO", 3GPP TSG RAN WG Meeting#46, Sep. 2006, pp. 1-8, R1-062314.

NTT DoCoMo, "CDD-Based Pre-coding Scheme for Rank=1 and 2", 3GPP TSG RAN WG1 Meeting #46bis, Oct. 2006, pp. 1-7, R1-062732.

Taiwan Search Report—TW097104866—TIPO—Apr. 4, 2012.

* cited by examiner

MIMO TRANSMISSION WITH EXPLICIT AND IMPLICIT CYCLIC DELAYS

The present Application for Patent is a continuation-in-part of patent application Ser. No. 12/026,370, entitled "MIMO TRANSMISSION WITH EXPLICIT AND IMPLICIT CYCLIC DELAYS," filed Feb. 5, 2008, which claims priority to provisional U.S. Application Ser. No. 60/888,494, entitled "EFFICIENT CYCLIC DELAY DIVERSITY BASED PRECODING," filed Feb. 6, 2007, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support multiple-input multiple-output (MIMO) transmission. For MIMO, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reliability. In any case, it is desirable to send a MIMO transmission in a manner to achieve good performance.

SUMMARY

Techniques for transmitting data using a combination of explicit cyclic delay and implicit cyclic delay are described herein. Cyclic delay may be achieved by applying a phase ramp across subcarriers in the frequency domain or by cyclically shifting samples in the time domain. For explicit cyclic delay, a different phase ramp may be applied across subcarriers for each antenna, and the phase ramps for all antennas are known to a receiver. The receiver may perform the complementary processing to account for the explicit cyclic delay. For implicit cyclic delay, a different phase ramp may be applied across subcarriers for each antenna, and the phase ramps for the antennas are unknown to the receiver. The transmitter may transmit pilot with the same implicit cyclic delay. The receiver may account for the implicit cyclic delay based on a channel estimate derived from the pilot.

In one design, the transmitter may perform first processing for cyclic delay diversity (or explicit cyclic delay processing) based on a first set of cyclic delay values known to the receiver. The transmitter may perform precoding based on a precoding matrix either before or after the explicit cyclic delay processing. The transmitter may perform second processing for cyclic delay diversity (or implicit cyclic delay processing) based on a second set of cyclic delay values unknown to the receiver. The transmitter may perform both explicit and implicit cyclic delay processing for data and may perform only implicit cyclic delay processing for pilot. One entity (e.g., the transmitter or receiver) may select a delay from among a plurality of delays (which may include zero delay, small delay, and large delay) and may send the selected delay to the other entity (e.g., the receiver or transmitter). The first set of cyclic delay values may be determined based on the selected delay. The transmitter may autonomously (e.g., pseudo-randomly) select the second set of cyclic delay values without informing the receiver.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
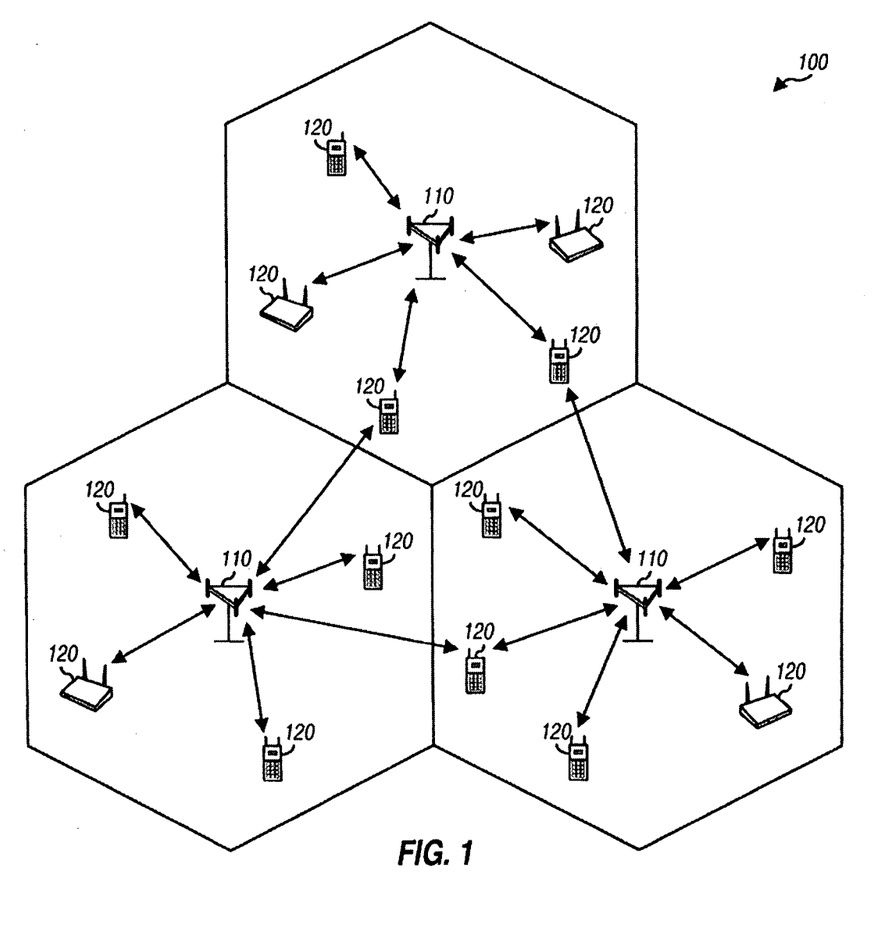
FIG. 1 shows a wireless multiple-access communication system.

FIG. 1 shows a wireless multiple-access communication system 100 with multiple Node Bs 110 and multiple user equipments (UEs). A Node B may be a fixed station that communicates with the UEs and may also be referred to as an evolved Node B (eNB), a base station, an access point, etc. Each Node B 110 provides communication coverage for a particular geographic area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmission on the downlink and uplink. The downlink (or forward link) refers to the communication link from the Node Bs to the UEs, and the uplink (or reverse link) refers to the communication link from the UEs to the Node Bs.

Figure 2:
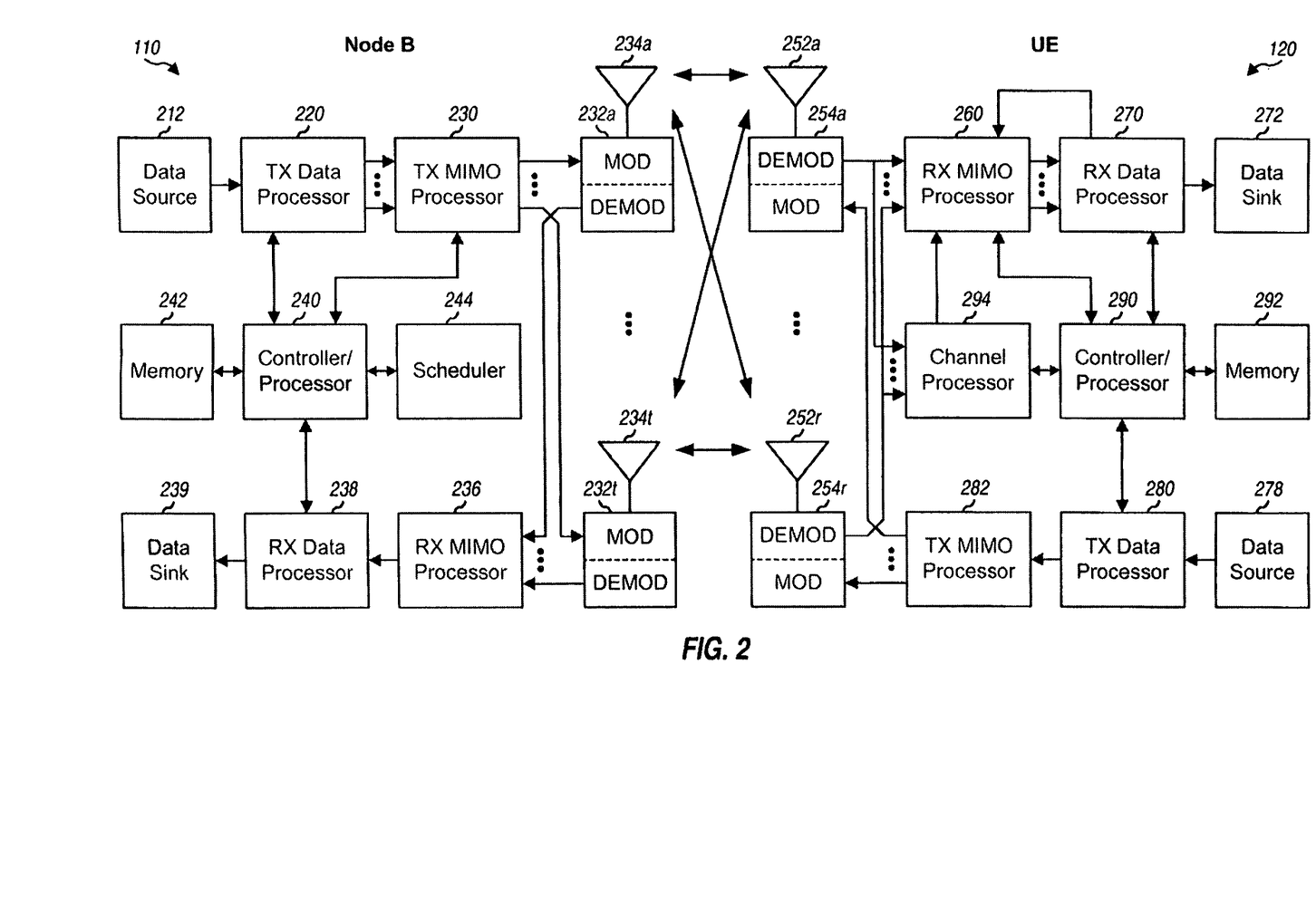
FIG. 2 shows a block diagram of a Node B and a UE.

FIG. 2 shows a block diagram of a design of a Node B 110 and a UE 120, which are one of the Node Bs and one of the UEs in FIG. 1. Node B 110 is equipped with multiple (T) antennas 234a through 234t. UE 120 is equipped with multiple (R) antennas 252a through 252r. Each of antennas 234 and 252 may be considered as a physical antenna.

At Node B 110, a TX data processor 220 may receive data from a data source 212, process (e.g., encode and symbol map) the data based on one or more modulation and coding schemes, and provide data symbols. As used herein, a data symbol is a symbol for data, a pilot symbol is a symbol for pilot, and a symbol may be a real or complex value. The data and pilot symbols may be modulation symbols from a modulation scheme such as PSK or QAM. Pilot is data that is known a priori by both the Node B and UE. A TX MIMO processor 230 may process the data and pilot symbols as described below and provide T output symbol streams to T modulators (MOD) 232a through 232t. Each modulator 232 may process its output symbol stream (e.g., for OFDM) to obtain an output sample stream. Each modulator 232 may further condition (e.g., convert to analog, filter, amplify, and upconvert) its output sample stream and generate a downlink signal. T downlink signals from modulators 232a through 232t may be transmitted via antennas 234a through 234t, respectively.

At UE 120, R antennas 252a through 252r may receive the T downlink signals from Node B 110, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM) to obtain received symbols. Each demodulator 254 may provide received data symbols to an RX MIMO processor 260 and provide received pilot symbols to a channel processor 294. Channel processor 294 may estimate the response of the MIMO channel from Node B 110 to UE 120 based on the received pilot symbols and provide a MIMO channel estimate to RX MIMO processor 260. RX MIMO processor 260 may perform MIMO detection on the received data symbols based on the MIMO channel estimate and provide detected symbols, which are estimates of the transmitted data symbols. An RX data processor 270 may process (e.g., symbol demap and decode) the detected symbols and provide decoded data to a data sink 272.

UE 120 may evaluate the channel conditions and generate feedback information, which may comprise various types of information as described below. The feedback information and data from a data source 278 may be processed (e.g., encoded and symbol mapped) by a TX data processor 280, spatially processed by a TX MIMO processor 282, and further processed by modulators 254a through 254r to generate R uplink signals, which may be transmitted via antennas 252a through 252r. At Node B 110, the R uplink signals from UE 120 may be received by antennas 234a through 234t, processed by demodulators 232a through 232t, spatially processed by an RX MIMO processor 236, and further processed (e.g., symbol demapped and decoded) by an RX data processor 238 to recover the feedback information and data sent by UE 120. Controller/processor 240 may control data transmission to UE 120 based on the feedback information.

Controllers/processors 240 and 290 may direct the operation at Node B 110 and UE 120, respectively. Memories 242 and 292 may store data and program codes for Node B 110 and UE 120, respectively. A scheduler 244 may schedule UE 120 and/or other UEs for data transmission on the downlink and/or uplink based on the feedback information received from all UEs.

The techniques described herein may be used for MIMO transmission on the downlink as well as the uplink. For clarity, certain aspects of the techniques are described below for MIMO transmission on the downlink in LTE. LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM.

Node B 110 may transmit L data symbols simultaneously via L layers on each subcarrier in each symbol period, where in general $L \geq 1$. A layer may correspond to one spatial dimension for each subcarrier used for transmission. Node B 110 may transmit data using various transmission schemes.

In an aspect, a MIMO transmission may be sent with a combination of explicit cyclic delay and implicit cyclic delay. The MIMO transmission may further be sent using preceding. The explicit cyclic delay, implicit cyclic delay, and preceding may be performed in various manners.

In one design, Node B 110 may process data symbols for each subcarrier k as follows:

$$y_d(k) = C(k)WD(k)Ud(k), \qquad \text{Eq (1)}$$

where
  d(k) is an L×1 vector containing L data symbols to be sent via L layers on subcarrier k in one symbol period,
  U is an L×L layer-to-virtual antenna mapping matrix,
  D(k) is an L×L explicit cyclic delay matrix for subcarrier k,
  W is a T×L preceding matrix,
  C(k) is a T×T implicit cyclic delay matrix for subcarrier k, and
  $y_d(k)$ is a T×1 vector containing T output symbols for data for the T transmit antennas on subcarrier k in one symbol period.

Node B 110 may process pilot symbols for each subcarrier k as follows:

$$y_p(k) = C(k)p(k), \qquad \text{Eq (2)}$$

where
  p(k) is a T×1 vector containing T pilot symbols to be sent on subcarrier k in one symbol period, and
  $y_p(k)$ is a T×1 vector containing T output symbols for pilot for the T transmit antennas on subcarrier k in one symbol period.

Equations (1) and (2) are for one subcarrier k. The same processing may be performed for each subcarrier used for transmission. In the description herein, a matrix may have one or multiple columns.

The preceding matrix W may be used to form up to T virtual antennas with T physical antennas 234a through 234t. Each virtual antenna may be formed with one column of W. A data symbol may be multiplied by one column of W and may then be sent on one virtual antenna and all T physical antennas. W may be based on a Fourier matrix or some other matrix. W may be selected from a set of preceding matrices.

The layer-to-virtual antenna mapping matrix U may be used to map the data symbols for the L layers to L virtual antennas selected from the T available virtual antennas. U may be defined based on a layer to virtual antenna mapping selected for use. U may also be an identity matrix I with ones along the diagonal and zeros elsewhere. The same or different mapping matrices may be used for the K subcarriers.

The explicit cyclic delay matrix D(k) may be used to achieve cyclic delay diversity, which may provide beamforming gain, frequency selective scheduling gain, and/or diversity gain. D(k) may also be used to achieve layer permutation, which may have certain advantages. D(k) may be generated based on a delay selected from a set of delays, which may include a large delay greater than a cyclic prefix length.

The implicit cyclic delay matrix C(k) may also be used to achieve cyclic delay diversity. C(k) may be generated in various manners and may be constrained to be less than the cyclic prefix length.

In the design shown in equation (1), the precoding with W is performed after the explicit cyclic delay processing with D(k). The explicit cyclic delay is thus applied to virtual antennas formed by the precoding matrix W (instead of physical antennas). This design may be used for large delay.

Figure 3A:
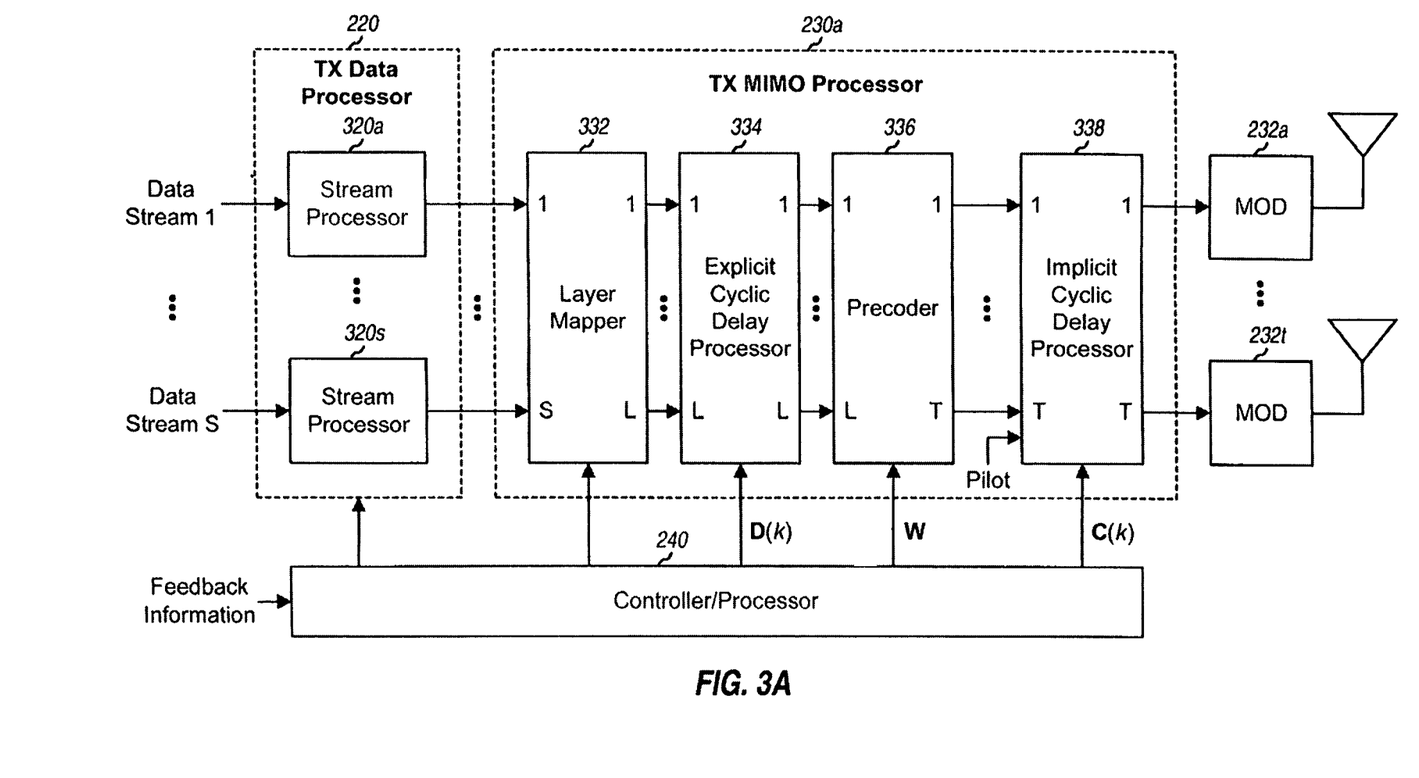
FIGS. 3A and 3B show two designs of a transmit (TX) MIMO processor.

FIG. 3A shows a block diagram of a TX MIMO processor 230a, which implements equations (1) and (2) and is one design of TX MIMO processor 230 at Node B 110 in FIG. 2. Within TX data processor 220, S stream processors 320a through 320s may receive S data streams from data source 212, where in general S≧1. Each stream processor 320 may encode, interleave, scramble, and symbol map its data stream to obtain data symbols. Each data stream may carry one transport block or packet in each transmission time interval (TTI). Each stream processor 320 may process its transport block to obtain a codeword and may then map the codeword to a block of modulation symbols. The terms "data stream", "transport block", "packet" and "codeword" may be used interchangeably. Stream processors 320a through 320s may provide S data symbol streams.

Within TX MIMO processor 230a, a layer mapper 332 may map the data symbols for the S data streams to L virtual antennas selected for use. In one design, mapper 332 may map the data symbols for the S data streams to L layers and may then map the data symbols for the L layers to subcarriers and virtual antennas used for transmission. An explicit cyclic delay processor 334 may multiply the mapped symbols for each subcarrier with the explicit cyclic delay matrix D(k). A precoder 336 may multiply the symbols from processor 334 for each subcarrier with the precoding matrix W and provide precoded symbols for that subcarrier. An implicit cyclic delay processor 338 may receive the precoded symbols from precoder 336 and pilot symbols and may multiply the symbols for each subcarrier with the implicit cyclic delay matrix C(k) to obtain output symbols. Processor 338 may provide T output symbol streams to T modulators 232a through 232t.

Each modulator 232 may perform OFDM modulation for a respective output symbol stream. Within each modulator 232, K output symbols to be sent on the K total subcarriers in one OFDM symbol period may be transformed with a K-point inverse discrete Fourier transform (IDFT) to obtain a useful portion containing K time-domain samples. Each time-domain sample is a complex value to be transmitted in one sample period. The last C samples of the useful portion may be copied and appended to the front of the useful portion to form an OFDM symbol containing K+C samples. The copied portion is referred to as a cyclic prefix and is used to combat inter-symbol interference (ISI) caused by frequency selective fading. Each modulator 232 may further process its sample stream to generate a downlink signal.

Controller/processor 240 may receive feedback information from UE 120 and generate controls for stream processors 320 and layer mapper 332. Controller/processor 240 may also provide the explicit cyclic delay matrix D(k) to processor 334, the precoding matrix W to precoder 336, and the implicit cyclic delay matrix C(k) to processor 338.

In another design, Node B 110 may process the data symbols for each subcarrier k as follows:

$$y_d(k)=C(k)D(k)WUd(k), \quad \text{Eq (3)}$$

where D(k) is a T×T explicit cyclic delay matrix for subcarrier k. Node B 110 may process pilot symbols for each subcarrier k as shown in equation (2).

In the design shown in equation (3), the explicit cyclic delay processing with D(k) is performed after the precoding with W. The explicit cyclic delay is thus applied to physical antennas instead of virtual antennas. This design may be used for zero delay and small delay.

Figure 3B:
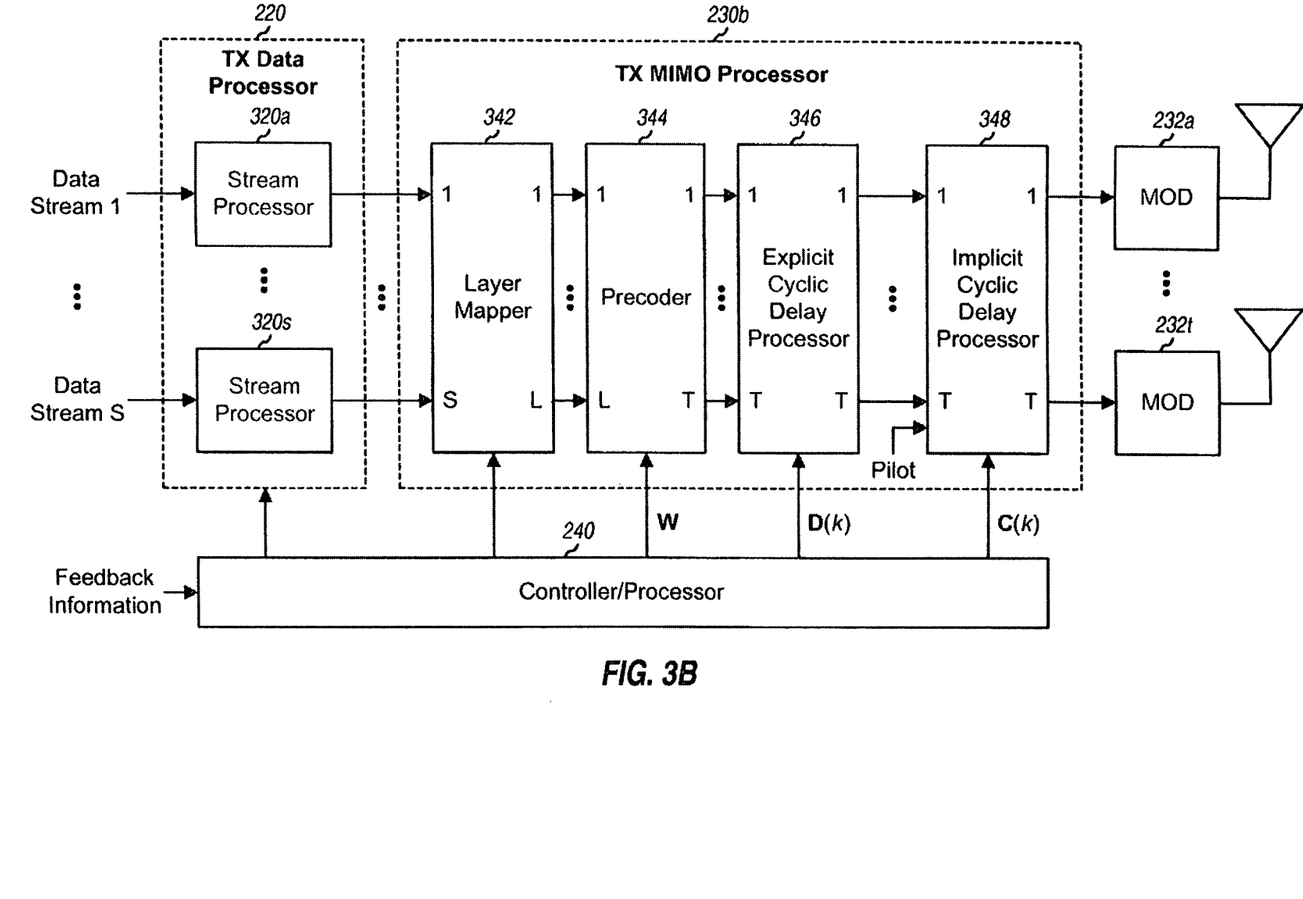

FIG. 3B shows a block diagram of a TX MIMO processor 230b, which implements equations (2) and (3) and is another design of TX MIMO processor 230 at Node B 110 in FIG. 2. Within TX MIMO processor 230b, a layer mapper 342 may map the data symbols for the S data streams to L virtual antennas selected for use. A precoder 344 may multiply the mapped symbols for each subcarrier with the precoding matrix W and provide precoded symbols for that subcarrier. An explicit cyclic delay processor 346 may multiply the precoded symbols for each subcarrier with the explicit cyclic delay matrix D(k). An implicit cyclic delay processor 348 may receive the symbols from processor 346 and pilot symbols and may multiply the symbols for each subcarrier with the implicit cyclic delay matrix C(k) to obtain output symbols. Processor 348 may provide T output symbol streams to T modulators 232a through 232t.

In yet another design, Node B 110 may process the pilot symbols for each subcarrier k as follows:

$$y_p(k)=C(k)Vp(k), \quad \text{Eq (4)}$$

where V is a T×T unitary matrix. The unitary matrix V is characterized by the properties $V^H V=I$ and $V V^H=I$, which means that the columns of V are orthogonal to one another, the rows of V are also orthogonal to one another, and each column and each row has unit power. V may be based on a Fourier matrix or some other type of matrix. The design in equation (4) may allow the pilot to be transmitted via all T physical antennas. This design may be used for a pilot channel (CPICH), a synchronization channel (SCH), and/or other channels Various types of precoding matrix may be used for the designs shown in equations (1) and (3). In one design, a set of Q preceding matrices may be defined as follows:

$$W_i=\Lambda_i F, \text{ for } i=0,\ldots,Q-1, \quad \text{Eq (5)}$$

where
F is a Fourier matrix,
$\Lambda_i$ is the i-th phase shift matrix, and
$W_i$ is the i-th precoding matrix.

The elements of a T×T Fourier matrix F may be expressed as:

$$f_{u,v}=e^{-j2\pi \frac{u \cdot v}{T}}, \quad \text{Eq (6)}$$

for $u = 0, \ldots, T-1$ and $v = 0, \ldots, T-1$, where $f_{u,v}$ is the element in the u-th row and v-th column of the Fourier matrix.

In one design, the phase shift matrix $\Lambda_i$ may be expressed as:

$$\Lambda_i = \begin{bmatrix} e^{j\lambda_{i,0}} & 0 & \cdots & 0 \\ 0 & e^{j\lambda_{i,1}} & \cdots & 0 \\ \vdots & \vdots & \ddots & \vdots \\ 0 & 0 & \cdots & e^{j\lambda_{i,T-1}} \end{bmatrix}, \quad \text{Eq (7)}$$

where $\lambda_{i,v}$ is a phase for the v-th antenna in the i-th phase shift matrix. Q different phase shift matrices may be defined with different phases $\lambda_{i,v}$ and/or by rotating one or more base matrices.

For the design shown in equation (5), Q different T×T precoding matrices $W_i$ may be defined based on the Fourier matrix F and Q different phase shift matrices $\Lambda_i$. The set of precoding matrices may also be defined with other unitary matrices instead of, or in additional to, the Fourier matrix. The set of precoding matrices may also include the identity matrix I, which may be used to transmit each layer on one physical antenna. For selective virtual antenna transmission, different combinations of columns (or submatrices) of the Q precoding matrices may be evaluated, and the L columns of the precoding matrix $W_i$ that provide the best performance may be provided as the precoding matrix W, where in general $1 \leq L \leq T$.

In one design, a set of explicit cyclic delay matrices may be defined for a set of delays. Each delay may be associated with V phase ramps for V antennas, where antenna 0 may have a zero phase ramp. If the explicit cyclic delay processing is performed prior to precoding as shown in FIG. 3A, then V=L, and the V antennas correspond to L selected virtual antennas. If the explicit cyclic delay processing is performed after precoding as shown in FIG. 3B, then V=T, and the V antennas correspond to T physical antennas. The dimension of the explicit cyclic delay matrix D(k) may thus be dependent on whether the explicit cyclic delay processing is performed prior to or after precoding. For clarity, much of the following description assumes that the explicit cyclic delay processing is performed prior to precoding as shown in FIG. 3A, and D(k) has dimension of L×L.

In one design, the set of explicit cyclic delay matrices may be defined as:

$$D_m(k) = \begin{bmatrix} 1 & 0 & \cdots & 0 \\ 0 & e^{-j\frac{2\pi \tau_m k}{K}} & \cdots & 0 \\ \vdots & \vdots & \ddots & \vdots \\ 0 & 0 & \cdots & e^{-j\frac{2\pi(L-1)\tau_m k}{K}} \end{bmatrix}, \quad \text{Eq (8)}$$

where $\tau_m$ is the m-th delay, which is the delay spacing between consecutive antennas, and $D_m(k)$ is an explicit cyclic delay matrix for the m-th delay.

In the design shown in equation (8), the cyclic delay value $\tau_{m,v}$ and the phase ramp $\theta_{m,v}$ of each antenna v may be expressed as:

$$\tau_{m,v} = \tau_m \cdot v, \quad \text{for } v = 0, \ldots, L-1, \text{ and} \quad \text{Eq (9)}$$

$$\theta_{m,v} = \frac{2\pi}{K} \tau_m \cdot v, \quad \text{for } v = 0, \ldots, L-1. \quad \text{Eq (10)}$$

The design in equation (8) uses uniform spacing of $\tau_m$ for the cyclic delay values of different antennas. The uniform delay spacing may reduce signaling overhead since the cyclic delay values of all L antennas may be defined based on a single $\tau_m$ value.

In one design, a set of M=3 delays may be defined to include the following:

$$\tau_0 = 0, \quad \text{for zero delay,} \quad \text{Eq (11)}$$

$$\tau_1 = 2, \quad \text{for small delay, and} \quad \text{Eq (12)}$$

$$\tau_2 = \frac{K}{L}, \quad \text{for large delay.} \quad \text{Eq (13)}$$

The small delay may be used to improve beamforming and frequency selective scheduling gain and may be especially beneficial for low mobility channel, low geometry channel, low rank channel, etc. The large delay may be used to improve transmit diversity gain and may be suitable for high mobility channel (e.g., for a mobile UE moving at 30 km/hr or faster), high geometry channel, higher rank channel, more coarse feedback in time or frequency, etc. The large delay may provide similar performance as the zero delay in low mobility channel, which may enhance robustness of the system when feedback information is noisy. Geometry is related to signal-to-noise-and-interference ratio (SINR). Low geometry may correspond to low SINRs, and high geometry may correspond to high SINRs. Rank refers to the number of virtual antennas selected for use and is also referred to as spatial multiplexing order. In one design, zero delay or small delay may be used for a rank-1 transmission, and large delay may be used for rank-2 or higher transmission. The cyclic delay diversity processing with large delay may equalize the SINRs of the L layers used for data transmission.

In general, explicit cyclic delay matrices may be defined for any number of delays and any particular delay. For example, explicit cyclic delay matrices may be defined for small delay of $\tau_1=1$ or some other value, for large delay of less than K/L or more than K/L, etc. The cyclic delay values for different antennas may have uniform spacing, as shown in equation (8) and (9). The cyclic delay values for different antennas may also have non-uniform spacing. In general, a small delay may be any value smaller than the cyclic prefix length, and a large delay may be any value larger than the cyclic prefix length.

In one design, the implicit cyclic delay matrix C(k) may be defined as:

$$C(k) = \begin{bmatrix} 1 & 0 & \cdots & 0 \\ 0 & e^{-j\frac{2\pi \zeta_1 k}{K}} & \cdots & 0 \\ \vdots & \vdots & \ddots & \vdots \\ 0 & 0 & \cdots & e^{-j\frac{2\pi \zeta_{T-1} k}{K}} \end{bmatrix}, \quad \text{Eq (14)}$$

where $\zeta_t$ is an implicit cyclic delay value for physical antenna t.

The phase ramp $\theta_t$ of each physical antenna t may be expressed as:

$$\theta_t = \frac{2\pi}{K}\zeta_t, \text{ for } t = 0, \ldots, T-1, \qquad \text{Eq (15)}$$

where $\theta_0 = \zeta_0 = 0$.

In general, any set of implicit cyclic delay values may be used for the T physical antennas. The implicit cyclic delay values may be pseudo-random values or may be values selected to achieve good performance. The implicit cyclic delay values should be shorter than the cyclic prefix length C, as follows:

$$-C < \zeta_t < C, \text{ for } t=0,\ldots,T-1. \qquad \text{Eq (16)}$$

The constraint in equation (16) may ensure that channel estimation based on the pilot transmitted with the implicit cyclic delay is not overly degraded due to aliasing effect.

In one design, the implicit cyclic delay value $\zeta_t$ for each physical antenna may be given by an integer number of samples. In this design, the implicit cyclic delay may be achieved by applying C(k) in the frequency domain or by cyclically shifting the useful portion in the time domain, as described below. In another design, the implicit cyclic delay value $\zeta_t$ for each physical antenna may be given by a non-integer number of samples.

In one design, a base set of T different implicit cyclic delay values may be defined. For example, the base set may include cyclic delay values of 0, 1, 2, ..., T−1. The implicit cyclic delay values for physical antennas 0 through T−1, or $\zeta_t$ for t=0, ..., T−1, may then be taken from the base set in a pseudo-random manner. This design may ensure that T different pseudo-randomly selected cyclic delay values are applied to the T physical antennas.

The implicit cyclic delay values for the T physical antennas may also be defined and selected in other manners. The implicit cyclic delay values may be static values that do not change over time, semi-static values that may change slowly over time, or dynamic values that may change frequently, e.g., every symbol period, every slot of multiple symbol periods, every subframe of multiple slots, etc.

For the design shown in equation (1), the processing for the data symbols with the large delay shown in equation (13) may be expressed as:

$$\underbrace{\begin{bmatrix} y_{d,0}(k) \\ y_{d,1}(k) \\ \vdots \\ y_{d,T-1}(k) \end{bmatrix}}_{y_d(k)} = \underbrace{\begin{bmatrix} 1 & 0 & \cdots & 0 \\ 0 & e^{-j\frac{2\pi\zeta_1 k}{K}} & \cdots & 0 \\ \vdots & \vdots & \ddots & \vdots \\ 0 & 0 & \cdots & e^{-j\frac{2\pi\zeta_{T-1}k}{K}} \end{bmatrix}}_{C(k)} W \underbrace{\begin{bmatrix} 1 & 0 & \cdots & 0 \\ 0 & e^{-j\frac{2\pi k}{L}} & \cdots & 0 \\ \vdots & \vdots & \ddots & \vdots \\ 0 & 0 & \cdots & e^{-j\frac{2\pi(L-1)k}{L}} \end{bmatrix}}_{D(k)} U \begin{bmatrix} d_0(k) \\ d_1(k) \\ \vdots \\ d_{L-1}(k) \end{bmatrix}. \qquad \text{Eq (17)}$$

The processing for the pilot symbols may be expressed as:

$$\underbrace{\begin{bmatrix} y_{p,0}(k) \\ y_{p,1}(k) \\ \vdots \\ y_{p,T-1}(k) \end{bmatrix}}_{y_p(k)} = \underbrace{\begin{bmatrix} 1 & 0 & \cdots & 0 \\ 0 & e^{-j\frac{2\pi\zeta_1 k}{K}} & \cdots & 0 \\ \vdots & \vdots & \ddots & \vdots \\ 0 & 0 & \cdots & e^{-j\frac{2\pi\zeta_{T-1}k}{K}} \end{bmatrix}}_{C(k)} \underbrace{\begin{bmatrix} p_0(k) \\ p_1(k) \\ \vdots \\ p_{T-1}(k) \end{bmatrix}}_{p(k)}. \qquad \text{Eq (18)}$$

The implicit cyclic delay matrix C(k) may be applied in the frequency domain as shown in equation (1) and may be a function of subcarrier k. C(k) provides a phase ramp (i.e., a linear phase shift) across the K subcarriers on each physical antenna. The slope of the phase ramp may be different for different antennas, and antenna 0 may have zero phase ramp. Applying a phase ramp in the frequency domain is equivalent to performing a cyclic shift of the useful portion of an OFDM symbol in the time domain.

Figure 4:
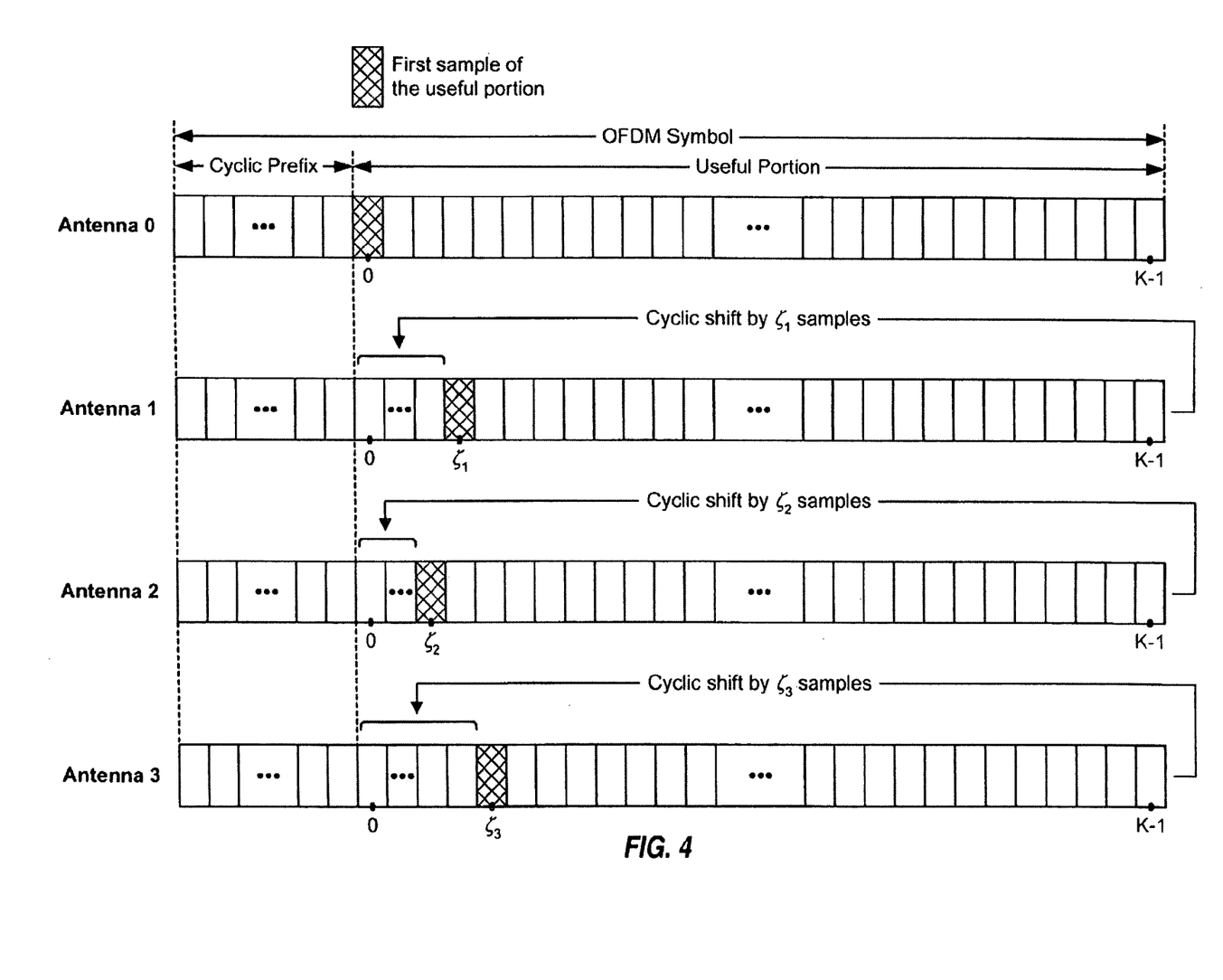
FIG. 4 shows cyclic delay in the time domain.

FIG. 4 shows an example of applying implicit cyclic delay in the time domain. In this example, T=4 and $\zeta_t$ for each physical antenna is given by an integer number of samples. The useful portion of an OFDM symbol for antenna 0 may be cyclically shifted by zero samples, the useful portion of an OFDM symbol for antenna 1 may be cyclically shifted by $\zeta_1$ samples, the useful portion of an OFDM symbol for antenna 2 may be cyclically shifted by $\zeta_2$ samples, and the useful portion of an OFDM symbol for antenna 3 may be cyclically shifted by $\zeta_3$ samples. $\zeta_1$, $\zeta_2$ and $\zeta_3$ may be pseudo-random values or may be related in some manner.

The cyclic delay matrices D(k) and C(k) may be used to support various delays including zero delay, small delay, large delay, and uniform and non-uniform spacing among the cyclic delay values for different antennas. These matrices may also reduce evaluation complexity (for selecting a delay out of all possible delays) and signaling overhead (for notification of the selected delay). The delay may be selected in various manners.

In one design, the Node B may select an explicit delay for each UE and may send the selected delay to the UE. In another design, the Node B may select an explicit delay for all UEs served by the Node B and may broadcast or send the selected delay to these UEs. In yet another design, the Node B may restrict the set of delays differently for each rank in order to reduce UE computational complexity as well as feedback overhead. For example, only zero delay may be allowed for rank 1, both zero delay and large delay may be allowed for rank 2, etc.

In one design, the UE may evaluate different possible precoding matrices and different possible delays based on a performance metric and may select the precoding matrix and the delay with the best performance metric. For each possible combination of a preceding matrix $W_i$ and a delay $\tau_m$, the UE may compute an effective MIMO channel estimate $H_{eff}(k)$ based on a MIMO channel estimate H(k), the precoding matrix $W_i$, and the explicit cyclic delay matrix $D_m(k)$. The UE may evaluate different hypotheses, with each hypothesis corresponding to a different preceding submatrix $W_{i,s}$ for a different combination of virtual antennas (i.e., a different column subset of $H_{eff}(k)$) that may be used for data transmission. The UE may estimate a set of SINRs for each hypothesis based on $H_{eff}(k)$, the MIMO detection technique used by the UE, and uniform distribution of the available transmit power across all virtual antennas for the hypothesis. The UE may then map each SINR to capacity based on a capacity function and may accumulate the capacities of all K subcarriers for all virtual antennas for each hypothesis to obtain a sum capacity for that hypothesis. After evaluating all hypotheses for all possible combinations of preceding matrix and explicit cyclic delay value, the UE may select the best hypothesis for the best combination of precoding matrix and delay with the largest sum capacity. The UE may send the precoding submatrix $W_{i,s}$ and the delay for the best hypothesis as the preceding matrix W and the delay to use for data transmission. The preceding matrix W may contain the L best columns of $W_i$ for L selected virtual antennas.

The UE may also determine S SINRs of S data streams to send on the L selected virtual antennas. The SINR of each data stream may be determined based on the SINRs of the subcarriers and virtual antennas for that data stream. The UE may also determine S channel quality indicator (CQI) values based on the SINRs of the S data streams. A CQI value may comprise an average SINR, a modulation and coding scheme (MCS), a packet format, a transport format, etc. The UE may send the S CQI values for the S data streams or may send a base CQI value and a differential CQI value. The base CQI value may represent the SINR of the data stream decoded first, and the differential CQI value may represent the difference between the SINRs of two data streams.

In one design, the Node B may arbitrarily select the implicit cyclic delay value of each physical antenna. The Node B may send pilot symbols and data symbols with the same implicit cyclic delay processing, and the UE may estimate the MIMO channel response based on these pilot symbols. In this case, the MIMO channel estimate would include both the actual MIMO channel response and the implicit cyclic delay matrices applied by the Node B. The phase shift caused by the implicit cyclic delay matrices may be perceived as part of the MIMO channel fluctuation by the UE, and the UE does not need to know the implicit cyclic delay value of each antenna. By transmitting the pilot with the implicit cyclic delay matrices, the Node B can arbitrarily select and change the implicit cyclic delay values, and the change would be transparent to the UE.

By using a small number of explicit delays (e.g., zero delay, small delay, and large delay) with uniform delay spacing among the L virtual antennas, the signaling overhead between the Node B and the UE and/or selection complexity at the UE may be reduced. The Node B can select and apply various implicit cyclic delay values without having to inform the UE.

Figure 5:
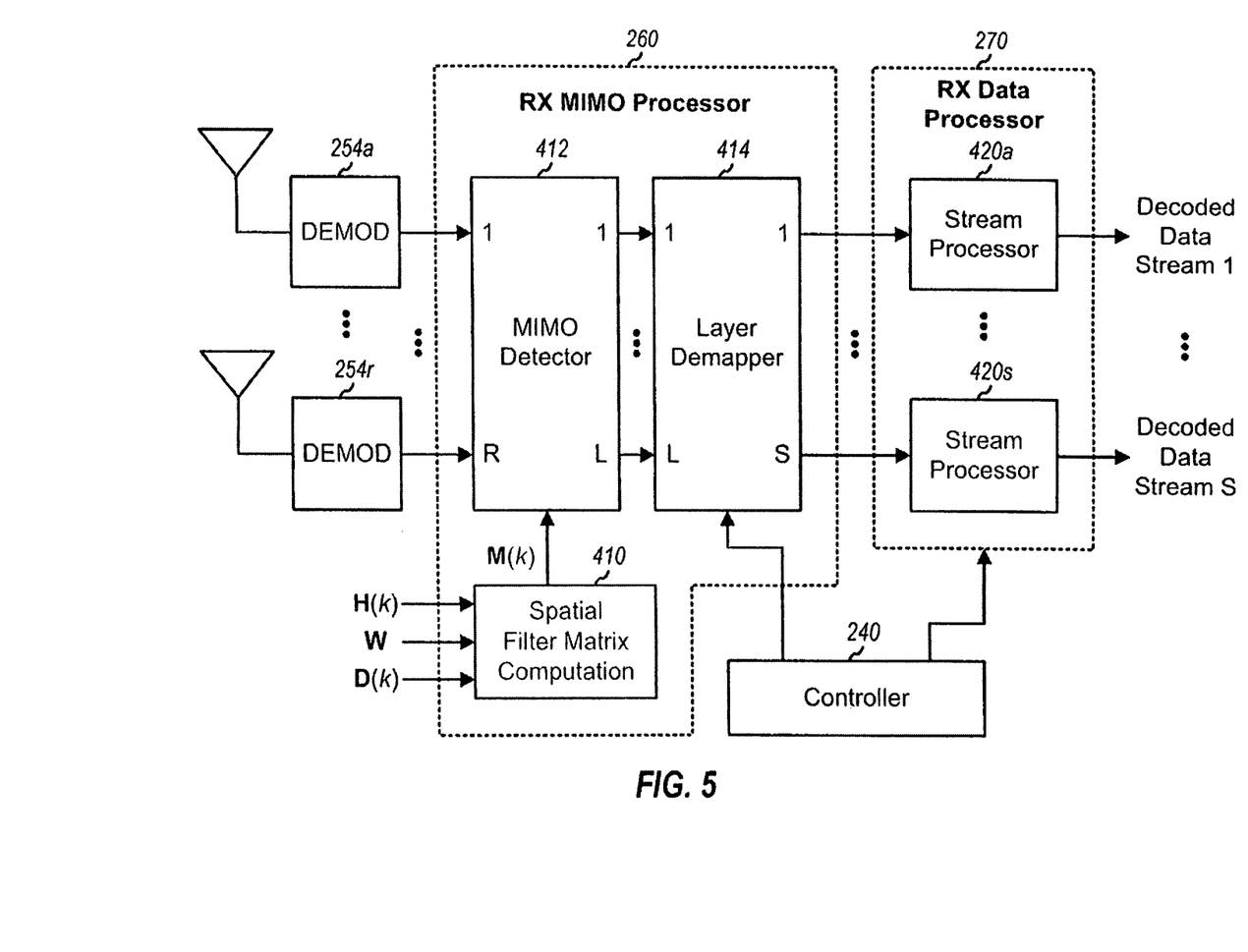
FIG. 5 shows a design of a receive (RX) MIMO processor.

FIG. 5 shows a block diagram of a design of RX MIMO processor 260 and RX data processor 270 at UE 120 in FIG. 2. The received pilot symbols from demodulators 254a through 254r may be expressed as:

$$r_p(k)=H(k)C(k)p(k), \text{ or} \qquad \text{Eq (19)}$$

$$r_p(k)=H(k)C(k)Vp(k), \qquad \text{Eq (20)}$$

where H(k) is an R×T MIMO channel matrix for subcarrier k, and $r_p(k)$ is an R×1 vector containing R received pilot symbols for the R receive antennas on subcarrier k in one symbol period.

Equation (19) may be applicable if the pilot symbols are transmitted as shown in equation (2). Equation (20) may be applicable if the pilot symbols are transmitted as shown in equation (4).

Channel estimator 294 may derive a MIMO channel estimate based on the received pilot symbols. The MIMO channel estimate may be expressed as:

$$H_{est}(k)=H(k)C(k), \text{ or} \qquad \text{Eq (21)}$$

$$H_{est}(k)=H(k)C(k)V, \qquad \text{Eq (22)}$$

where $H_{est}(k)$ is an R×T estimated MIMO channel matrix for subcarrier k. For simplicity, equations (21) and (22) assume no channel estimation error. The MIMO channel estimate may include a set of estimated MIMO channel matrices for all subcarriers used for transmission. As shown in equations (21) and (22), the MIMO channel estimate $H_{est}(k)$ includes the actual MIMO channel H(k) as well as the implicit cyclic delay matrix C(k) and the unitary matrix V (if any) used for the pilot.

Within RX MIMO processor 260, a computation unit 510 may receive the MIMO channel estimate $H_{est}(k)$ from channel estimator 294 and the preceding matrix W and the explicit cyclic delay matrix D(k) selected for use. If the pilot is transmitted as shown in equation (4), then processor 260 may remove the unitary matrix V used for the pilot as follows $H_{est}(k)=H_{est}(k)V^H$.

Unit 510 may compute an effective MIMO channel estimate, as follows:

$$H_{eff}(k)=H_{est}(k)D(k)WU, \text{ or} \qquad \text{Eq (23)}$$

$$H_{eff}(k)=H_{est}(k)WD(k)U, \qquad \text{Eq (24)}$$

where $H_{eff}(k)$ is an R×L effective MIMO channel matrix for subcarrier k. $H_{eff}(k)$ is the effective MIMO channel observed by the data symbols and is for the L virtual antennas used for data transmission.

Equation (23) may be used if the Node B performs precoding and explicit cyclic delay processing as shown in equation (1). Equation (24) may be used if the Node B performs precoding and explicit cyclic delay processing as shown in equation (3). Unit 510 may then compute a spatial filter matrix M(k) for each subcarrier k based on $H_{eff}(k)$ and in accordance with minimum mean square error (MMSE), linear MMSE (LMMSE), zero-forcing (ZF), or some other MIMO detection technique.

A MIMO detector 512 may obtain R received data symbol streams from R demodulators 254a through 254r. MIMO detector 512 may perform MIMO detection on the R received data symbol streams with the spatial filter matrix M(k) for each subcarrier k and provide L detected symbol streams for the L selected virtual antennas. A layer demapper 514 may demap the L detected symbol streams in a manner complementary to the mapping performed by layer mapper 332 in FIG. 3A or layer mapper 342 in FIG. 3B and may provide S demapped symbol streams for the S data streams.

RX data processor 270 includes S stream processors 520a through 520s for the S data streams. Each stream processor 520 may symbol demap, descramble, deinterleave, and decode its demapped symbol stream and provide a decoded data stream.

Figure 6:
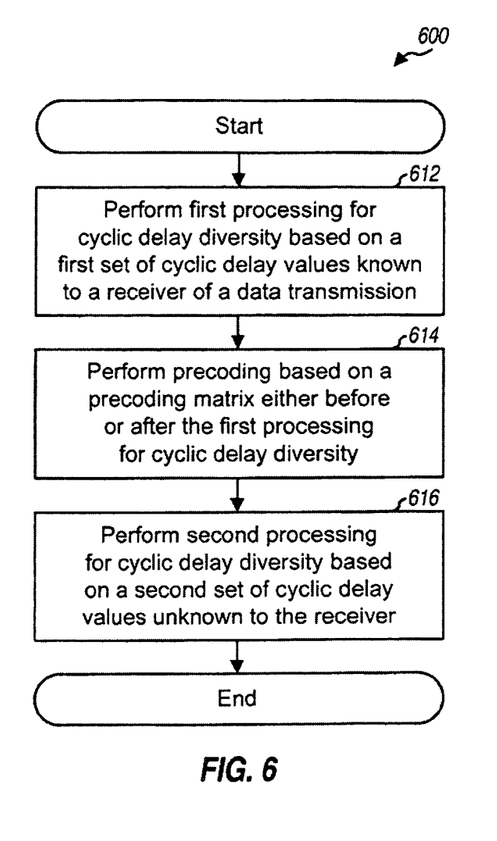
FIG. 6 shows a process for transmitting data.

FIG. 6 shows a design of a process 600 for transmitting data in a wireless communication system. Process 600 may be performed by a transmitter such as a Node B, a UE, etc. For process 600, the transmitter may perform first processing for cyclic delay diversity (or explicit cyclic delay processing) based on a first set of cyclic delay values (e.g., $\tau_{m,0}$ through $\tau_{m,L-1}$) known to a receiver of a data transmission (block 612). The transmitter may perform precoding based on a preceding matrix W either before or after the first processing for cyclic delay diversity (block 614). The transmitter may perform second processing for cyclic delay diversity (or implicit cyclic delay processing) based on a second set of cyclic delay values (e.g., $\zeta_0$ through $\zeta_{T-1}$) unknown to the receiver (block 616).

The transmitter may perform the first and second processing for cyclic delay diversity for data, e.g., as shown in equation (1) or (3). The transmitter may perform only the second processing for cyclic delay diversity for pilot, e.g., as shown in equation (2) or (4). The transmitter may process the pilot with a unitary matrix V that is not applied to the data. The transmitter may perform the first processing for cyclic delay diversity in the frequency domain, e.g., by applying the explicit cyclic delay matrix D(k) for each subcarrier k. The transmitter may perform the second processing for cyclic delay diversity in the time domain, e.g., by cyclically shifting the samples of the useful portion as shown in FIG. 4.

In one design, the transmitter may receive feedback information indicating one of a plurality of delays, which may include zero delay, small delay, and large delay shown in equations (11) through (13). The transmitter may determine the first set of cyclic delay values based on the delay indicated by the feedback information. In another design, the transmitter may select a delay from among the plurality of delays and may send the selected delay to the receiver. The transmitter may then determine the first set of cyclic delay values based on the selected delay. The transmitter may autonomously (e.g., pseudo-randomly) select the cyclic delay values in the second set without having to inform the receiver and may constrain these cyclic delay values to be shorter than the cyclic prefix length.

Figure 7:
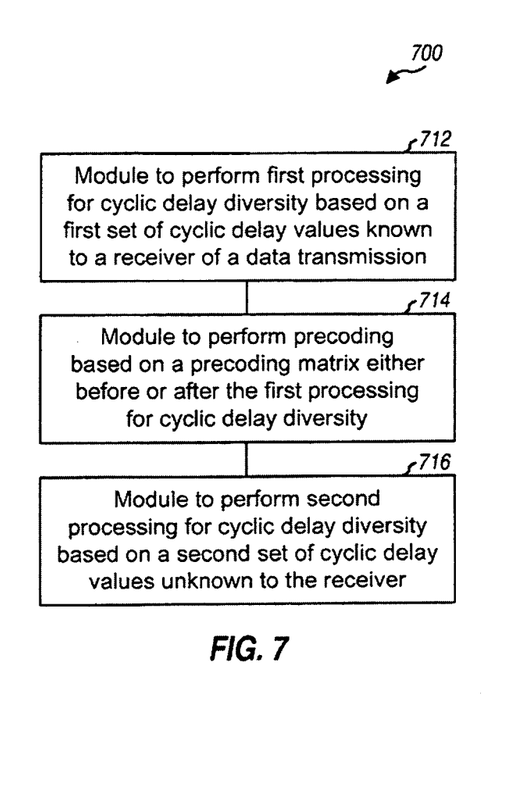
FIG. 7 shows an apparatus for transmitting data.

FIG. 7 shows a design of an apparatus 700 for transmitting data in a wireless communication system. Apparatus 700 includes means for performing first processing for cyclic delay diversity based on a first set of cyclic delay values known to a receiver of a data transmission (module 712), means for performing precoding based on a precoding matrix either before or after the first processing for cyclic delay diversity (module 714), and means for performing second processing for cyclic delay diversity based on a second set of cyclic delay values unknown to the receiver (module 716).

Figure 8:
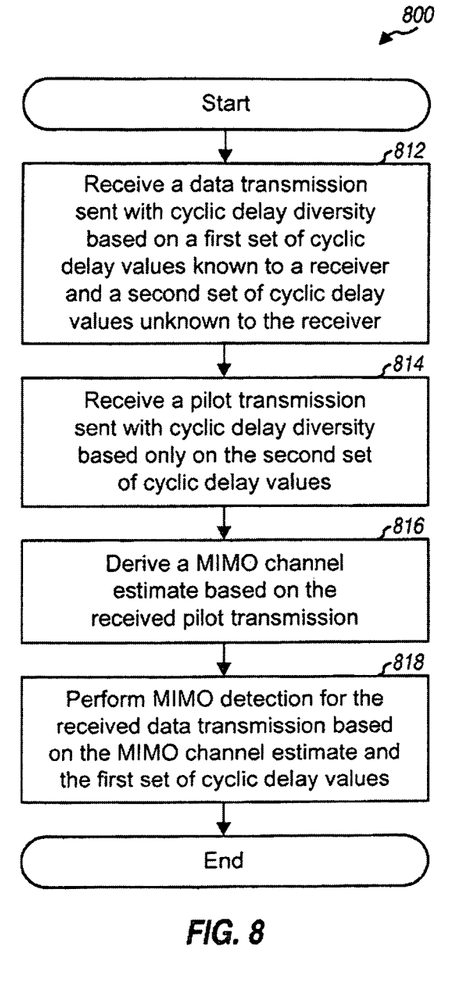
FIG. 8 shows a process for receiving data.

FIG. 8 shows a design of a process 800 for receiving data in a wireless communication system. Process 800 may be performed by a receiver such as a UE, a Node B, etc. For process 800, the receiver may receive a data transmission sent with cyclic delay diversity based on a first set of cyclic delay values (e.g., $\tau_{m,0}$ through $\tau_{m,L-1}$) known to the receiver and a second set of cyclic delay values (e.g., $\zeta_0$ through $\zeta_{T-1}$) unknown to the receiver (block 812). The receiver may receive a pilot transmission sent with cyclic delay diversity based only on the second set of cyclic delay values (block 814). The receiver may derive a MIMO channel estimate based on the received pilot transmission (block 816). The pilot transmission may be sent with a unitary matrix V not used for the data transmission. In this case, the MIMO channel estimate may be derived based further on the unitary matrix V. The MIMO channel estimate may comprise multiple MIMO channel matrices $H_{est}(k)$ for multiple subcarriers.

The receiver may perform MIMO detection for the received data transmission based on the MIMO channel estimate and the first set of cyclic delay values (block 818). In one design of block 818, the receiver may determine multiple cyclic delay matrices D(k) for the multiple subcarriers based on the first set of cyclic delay values. The receiver may derive multiple spatial filter matrices M(k) for the multiple subcarriers based on the multiple cyclic delay matrices D(k), the multiple MIMO channel matrices $H_{est}(k)$, and a precoding matrix W used for the data transmission. The receiver may then perform MIMO detection for the received data transmission based on the multiple spatial filter matrices.

The receiver may evaluate performance (e.g., sum capacity) of a plurality of precoding matrices and may send feedback information indicating the selected precoding matrix. The data transmission may be sent with precoding based on the selected precoding matrix. The receiver may perform MIMO detection for the received data transmission based further on the selected precoding matrix. The receiver may also evaluate a plurality of delays (e.g., zero delay, small delay, and large delay) and may send feedback information indicating the selected delay. The first set of cyclic delay values may be determined based on the selected delay. The receiver may also jointly evaluate the plurality of precoding matrices and the plurality of delays.

Figure 9:
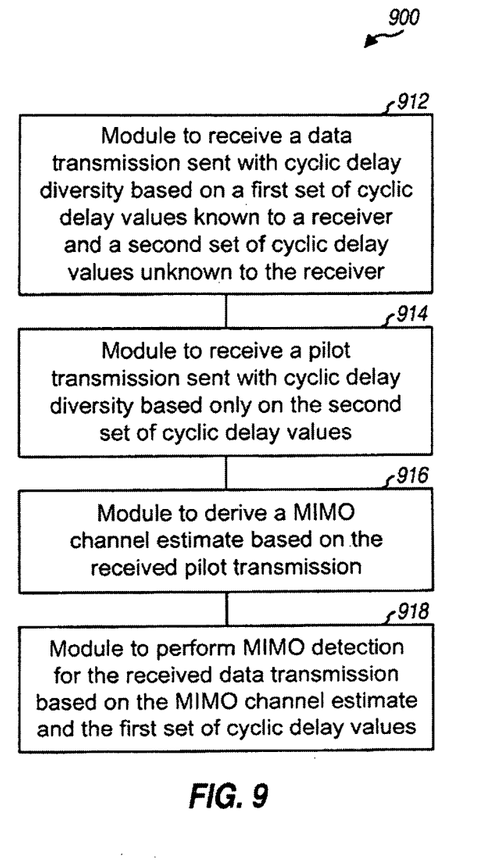
FIG. 9 shows an apparatus for receiving data.

FIG. 9 shows a design of an apparatus 900 for receiving data in a wireless communication system. Apparatus 900 includes means for receiving a data transmission sent with cyclic delay diversity based on a first set of cyclic delay values known to a receiver and a second set of cyclic delay values unknown to the receiver (module 912), means for receiving a pilot transmission sent with cyclic delay diversity based only on the second set of cyclic delay values (module 914), means for deriving a MIMO channel estimate based on the received pilot transmission (module 916), and means for perform MIMO detection for the received data transmission based on the MIMO channel estimate and the first set of cyclic delay values (module 918).

The modules in FIGS. 7 and 9 may comprise processors, electronics devices, hardware devices, electronics components, logical circuits, memories, etc., or any combination thereof.

In much of the description above, the processing for cyclic delay diversity with C(k) is implicit, and C(k) is unknown to the UE. In another design, the processing for cyclic delay diversity with C(k) is explicit, and C(k) is known to (e.g., signaled to) the UE. Data symbols may be processed with C(k) in the same manner regardless of whether C(k) is implicit or explicit. Pilot symbols may be processed with C(k) when it is implicit (as described above) and may or may not be processed with C(k) when it is explicit.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    at least one processor configured to perform first processing for cyclic delay diversity for data based on a first set of cyclic delay values known to a receiver of a data transmission, and to perform second processing for cyclic delay diversity for the data based on a second set of cyclic delay values unknown to the receiver; and
    a memory coupled to the at least one processor.

2. The apparatus of claim 1, wherein the at least one processor is configured to perform only the second processing for cyclic delay diversity for pilot.

3. The apparatus of claim 1, wherein the at least one processor is configured to perform the first processing for cyclic delay diversity in frequency domain, and to perform the second processing for cyclic delay diversity in frequency domain or time domain.

4. The apparatus of claim 1, wherein the first set of cyclic delay values corresponds to a first cyclic delay longer than a cyclic prefix length, and wherein the second set of cyclic delay values corresponds to a second cyclic delay shorter than the cyclic prefix length.

5. The apparatus of claim 1, wherein the at least one processor is configured to receive feedback information indicating one of a plurality of cyclic delays from the receiver, and to determine the first set of cyclic delay values based on the cyclic delay indicated by the feedback information.

6. The apparatus of claim 1, wherein the first set of cyclic delay values corresponds to no cyclic delay, or a small cyclic delay of less than a cyclic prefix length, or a large cyclic delay of greater than the cyclic prefix length.

7. The apparatus of claim 1, wherein the at least one processor is configured to select a cyclic delay from among a plurality of cyclic delays, to send the selected cyclic delay to the receiver, and to determine the first set of cyclic delay values based on the selected cyclic delay.

8. The apparatus of claim 1, wherein the at least one processor is configured to autonomously select the cyclic delay values in the second set without informing the receiver.

9. The apparatus of claim 1, wherein the at least one processor is configured to determine the cyclic delay values in the second set based on feedback information from the receiver.

10. The apparatus of claim 1, wherein the at least one processor is configured to perform precoding based on a precoding matrix after the first processing for cyclic delay diversity and prior to the second processing for cyclic delay diversity.

11. The apparatus of claim 1, wherein the at least one processor is configured to perform precoding based on a precoding matrix prior to the first processing for cyclic delay diversity.

12. The apparatus of claim 2, wherein the at least one processor is configured to process the pilot with a unitary matrix not applied to the data.

13. A method for wireless communication, comprising:
    performing first processing for cyclic delay diversity for data based on a first set of cyclic delay values known to a receiver of a data transmission; and
    performing second processing for cyclic delay diversity for the data based on a second set of cyclic delay values unknown to the receiver.

14. The method of claim 13, further comprising:
    performing only the second processing for cyclic delay diversity for pilot.

15. The method of claim 13, wherein the performing the first processing for cyclic delay diversity comprises performing the first processing for cyclic delay diversity in frequency domain, and wherein the performing the second processing for cyclic delay diversity comprises performing the second processing for cyclic delay diversity in frequency domain or time domain.

16. The method of claim 13, further comprising:
receiving feedback information indicating one of a plurality of cyclic delays from the receiver; and
determining the first set of cyclic delay values based on the cyclic delay indicated by the feedback information.

17. The method of claim 13, further comprising:
autonomously selecting the cyclic delay values in the second set without informing the receiver.

18. The method of claim 13, further comprising:
performing precoding based on a precoding matrix either before or after the first processing for cyclic delay diversity and prior to the second processing for cyclic delay diversity.

19. An apparatus for wireless communication, comprising:
means for performing first processing for cyclic delay diversity for data based on a first set of cyclic delay values known to a receiver of a data transmission; and
means for performing second processing for cyclic delay diversity for the data based on a second set of cyclic delay values unknown to the receiver.

20. The apparatus of claim 19, further comprising:
means for performing only the second processing for cyclic delay diversity for pilot.

21. The apparatus of claim 19, wherein the means for performing the first processing for cyclic delay diversity comprises means for performing the first processing for cyclic delay diversity in frequency domain, and wherein the means for performing the second processing for cyclic delay diversity comprises means for performing the second processing for cyclic delay diversity in frequency domain or time domain.

22. The apparatus of claim 19, further comprising:
means for receiving feedback information indicating one of a plurality of cyclic delays from the receiver; and
means for determining the first set of cyclic delay values based on the cyclic delay indicated by the feedback information.

23. The apparatus of claim 19, further comprising:
means for autonomously selecting the cyclic delay values in the second set without informing the receiver.

24. The apparatus of claim 19, further comprising:
means for performing precoding based on a precoding matrix either before or after the first processing for cyclic delay diversity and prior to the second processing for cyclic delay diversity.

25. A non-transitory computer-readable medium comprising instructions which, when executed by a computer, cause the computer to perform operations including:
performing first processing for cyclic delay diversity for data based on a first set of cyclic delay values known to a receiver of a data transmission; and
performing second processing for cyclic delay diversity for the data based on a second set of cyclic delay values unknown to the receiver.

26. The non-transitory computer-readable medium of claim 25 which, when executed by the computer, cause the computer to perform operations further including:
performing only the second processing for cyclic delay diversity for pilot.

27. The non-transitory computer-readable medium of claim 25 which, when executed by the computer, cause the computer to perform operations further including:
performing the first processing for cyclic delay diversity in frequency domain, and
performing the second processing for cyclic delay diversity in frequency domain or time domain.

* * * * *